United States Patent
Martinelli et al.

(10) Patent No.: US 8,203,789 B1
(45) Date of Patent: Jun. 19, 2012

(54) DOUBLE-PASS DIFFRACTION GRATING

(75) Inventors: Massimo Martinelli, Santa Clara, CA (US); Long Yang, Union City, CA (US); Jeffrey E. Ehrlich, San Jose, CA (US); Mark H. Garrett, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 698 days.

(21) Appl. No.: 12/325,937

(22) Filed: Dec. 1, 2008

(51) Int. Cl.
*G02B 5/18* (2006.01)
*G02B 27/44* (2006.01)
*G02B 5/04* (2006.01)
*G01J 3/18* (2006.01)

(52) U.S. Cl. .................. 359/566; 359/834; 356/334

(58) Field of Classification Search .............. 359/566, 359/568, 833, 834; 356/334, 328
See application file for complete search history.

(56) References Cited

U.S. PATENT DOCUMENTS

| | | | |
|---|---|---|---|
| 4,025,196 A | 5/1977 | Chupp et al. | |
| 5,652,681 A | 7/1997 | Chen | |
| 6,563,977 B1 * | 5/2003 | Chen et al. | 385/24 |
| 2002/0186926 A1 * | 12/2002 | Hoose et al. | 385/37 |
| 2003/0048524 A1 * | 3/2003 | Chavez-Pirson et al. | 359/333 |
| 2003/0223132 A1 * | 12/2003 | Seifert | 359/833 |
| 2009/0135488 A1 * | 5/2009 | Aota et al. | 359/569 |

* cited by examiner

*Primary Examiner* — Alessandro Amari
(74) *Attorney, Agent, or Firm* — Joshua D. Isenberg; JDI Patent (57) ABSTRACT

An optical assembly for double passing a transmission grating may include a prism having first, second and third surfaces. A transmission grating may be bonded to the first surface. A first mirror coating may be bonded to the second surface and a second mirror coating to the third surface. The first, second and third surfaces, the transmission grating and the first and second mirror coatings are configured such that light of a predetermined wavelength entering the prism that is incident on the transmission grating is diffracted a first time by the transmission grating towards the second surface, reflected from the second surface to the third surface, reflected from the third surface back to the transmission grating, and diffracted a second time by the transmission grating as the light exits the prism.

17 Claims, 8 Drawing Sheets

DOUBLE-PASS DIFFRACTION GRATING

FIELD OF THE INVENTION

The present invention relates to an optical assembly and more particularly to an optical assembly employing a diffraction grating to angularly disperse light with enlarged dispersion coefficient and with low polarization dependence and low temperature dependence.

BACKGROUND OF THE INVENTION

Figure 1:
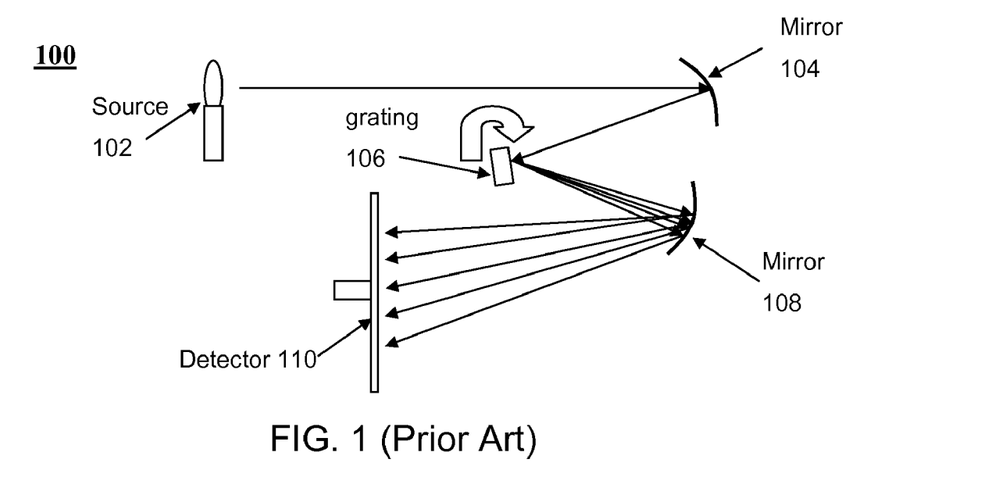
FIG. 1 is a schematic diagram of a conventional optical Spectrometer of the prior art.

An optical grating is a critical element in optics especially for the systems where specific wavelength dependent functions are performed. For example, a spectrometer is an instrument to measure the wavelength of the incident light and the spectral width of the light. A simple spectrometer diagram 100 is illustrated in FIG. 1. As shown in FIG. 1, incident light from a light source 102 is reflected by a mirror 104 and then diffracted by a grating 106. Light diffracted from the grating 106 is reflected by a second mirror 108. Reflected light is then collected by a detector 110.

Figure 2:
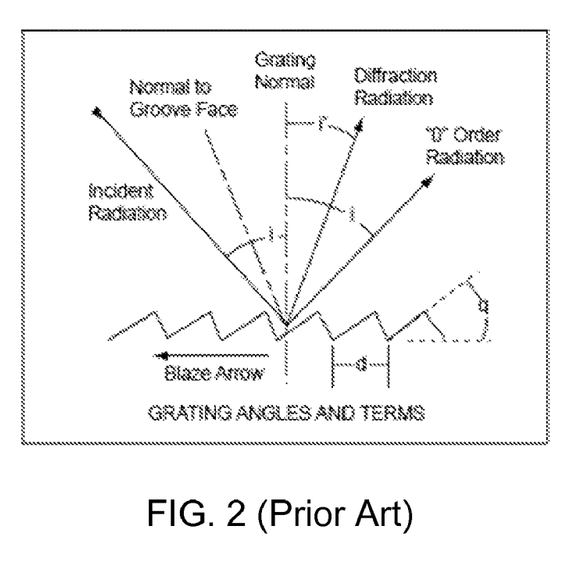
FIG. 2 illustrates the diffractions from a blazed grating in an optical spectrometer diagram of the type shown in FIG. 1.

The theory of a grating operation can be found in many textbooks. There are many different types of gratings. A reflection blazed grating 106 is illustrated in FIG. 1. The diffraction effect is produced by having periodic structure either inside the media or on the surface of the substrate. In general, as shown in FIG. 2, depending on the grating surface profile, there are multiple orders of the diffraction.

Figure 3:
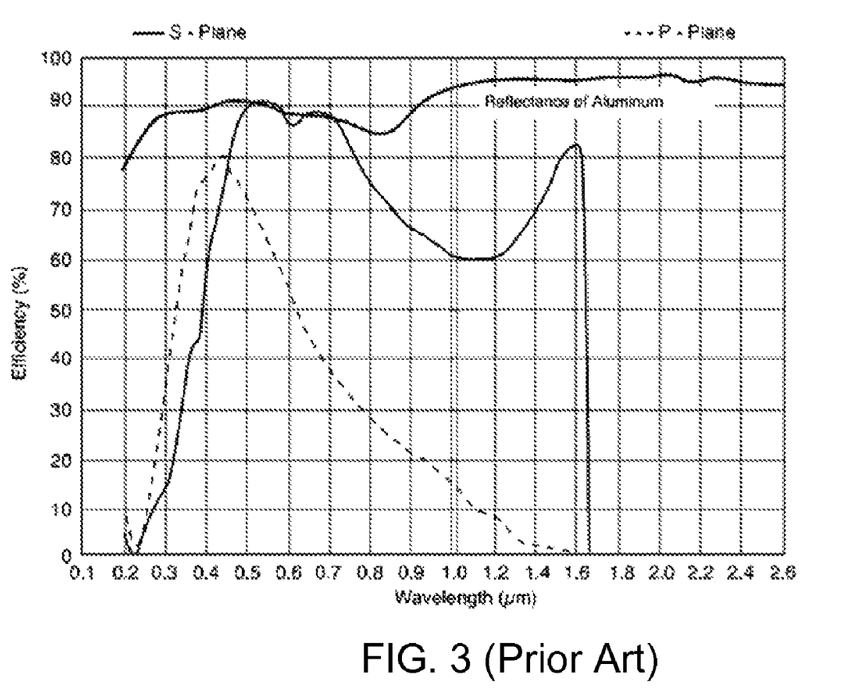
FIG. 3 is a plot illustrating spectral response of a commercially available grating in an optical spectrometer diagram of FIG. 1, showing both S- and P-polarizations.

The well-known grating equation is given below:

$$\Lambda(\sin\theta_{in} + \sin\theta_N) = N\lambda \quad \text{Equation 1}$$

where
N=0,±2, . . . if solutions exist.
λ: wavelength of light
$\theta_{in}$: the angle of incidence beam
$\theta_N$: the diffraction angle of $N^{th}$ order and,
Λ: the periodicity of the grating For each diffraction order, the diffraction angle $\theta_N$ is a function of wavelength as depicted in Equation 1. In addition, the diffraction efficiency is a function of the polarization of the input light. As shown in FIG. 3, the responses for S- and P-polarizations are different. The difference of the losses between these two polarizations is known as polarization dependent loss (PDL).

The dispersion coefficient can be computed by taking derivatives of both sides of Equation 1;

$$\frac{d\theta_N}{d\lambda} = \frac{N}{\Lambda\cos\theta_N} \quad \text{Equation 2}$$

The dispersion coefficient is higher for higher order modes. However, the diffraction efficiency will decrease as the number of allowed higher order modes increases. This represents a dilemma of the grating design.

The grating response is also temperature dependent because of change of the index of refraction of the grating material with temperature and/or changes in the periodicity of the grating structure due to thermal expansion.

Also, by carefully selecting the periodicity A of the grating, shown in Equation 1, it is possible to reduce the number of allowed diffraction orders to only a single order to avoid loss and cross talk.

A diffraction grating is commonly used to cause dispersive response to the input optical beam. The exit beam angle varies with the wavelengths. Even with the advancement of grating fabrication technology, the tradeoff between the diffraction efficiency (DE), dispersion coefficient (dθ/dλ) and its associated polarization dependent loss (PDL) remain an important design issue, in particular, when a very high dispersion coefficient is needed.

U.S. Pat. No. 4,025,196 disclosures an apparatus to perform correlation spectroscopy utilizing a zero dispersion monochromator having entrance, intermediate and exit slits. A ruled grating is located in the beam path between entrance and exit slits and is operable to disperse a beam of radiation incident thereon both prior and subsequent to radiation passage through the intermediate slit.

U.S. Pat. No. 5,652,681 disclosures a dispersive optical element called a "grism" which has characteristics of both a prism and a grating. The grism consists of a prism with a grating disposed adjacent to one surface of the prism. Light passing through the grism is dispersed by both the prism and the grating. The grating may be attached to either the first or second surface of the prism or may be simply adjacent to the prism. The grism has dispersive characteristics such as resolving power that can be optimized in a very flexible manner by choice of both the grating and prism characteristics. For example, the grating may be used to amplify the angular spread introduced by a prism. Also different diffractive orders of the grating may be used simultaneously.

It is possible to use two gratings in tandem to enlarge the overall dispersion coefficient. Such a configuration, used in spectroscopy, is called a double monochromator as described in "Diffraction Grating Handbook," fourth edition, Christopher Palmer, Richardson Grating Laboratory, Copyright 2000, pg. 55. In addition, one can insert a half-wave plate (HWP) between these two gratings to compensate the PDL.

A high performance diffraction grating is relatively expensive thus it is desired not to use two gratings if possible. The concept of double passing a single grating is known in the art. For instance, Kaiser Optical System, Inc. Ann Arbor, Mich. discusses the use of double passing a single transmission volume phase grating with a single reflective mirror to double the wavelength angular dispersion (http://www.kosi.com/). Similarly Wasatch Photonics, Inc., of Logan, Utah discusses double passing a transmission grating with a single reflective mirror for increased dispersion (http://www.wasatchphotonics.com/) In U.S. Pat. No. 6,563,977, a single grating configuration was also proposed, that is double passed for increasing the dispersion, to be used in WDM (wavelength division multiplexing) modules as shown in FIG. 4.

Figure 4:
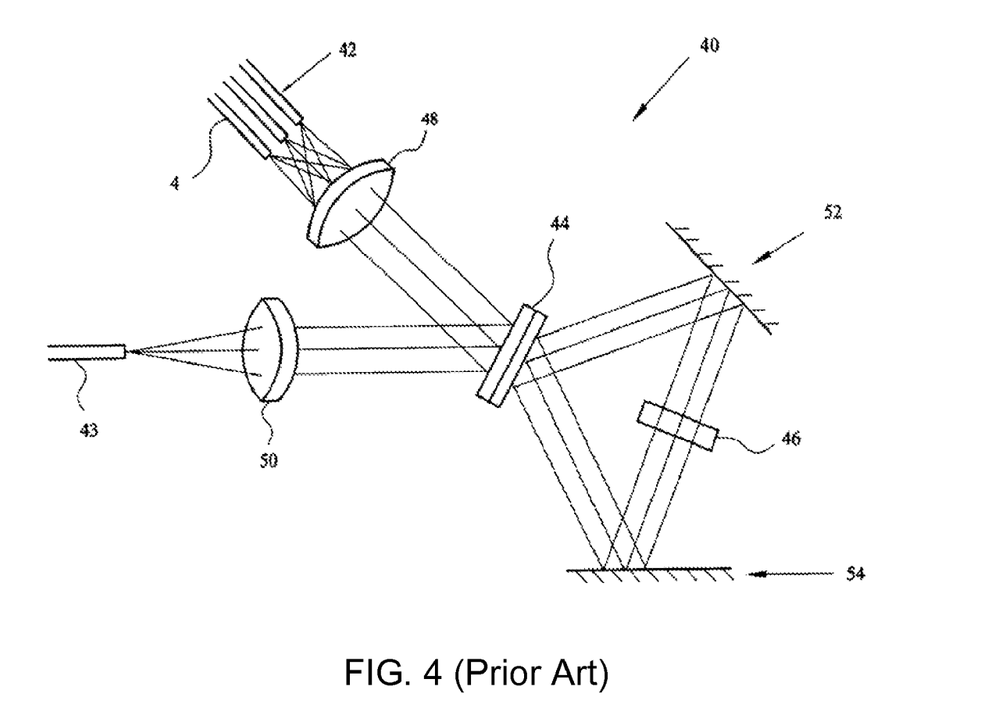
FIG. 4 is a schematic diagram of a double-pass grating configuration of the prior art.

FIG. 4 shows a block diagram generally illustrating a multiplexer-demultiplexer device 40. The device 40 includes an array 42 of optical fibers 4, each of the fibers 4 being either a multi-mode fiber or a single mode fiber; a single fiber 43 that is either a multi-mode fiber or a single mode fiber; a transmissive grating assembly 44 having a diffractive element for diffracting beams propagating therethrough; a polarization rotating element 46 for rotating the polarization plane of beams passing therethrough; a first focusing and collimating lens 48 for focusing and collimating beams propagating between the ends of the array 42 of fibers and the grating assembly 44, the first lens having a focal length associated therewith; a second focusing and collimating lens 50 for focusing and collimating beams propagating between the end of the single fiber 43 and the grating assembly 44, the second lens having a second focal length associated therewith; a first mirror 52 for reflecting beams radiating between the array 42 of fibers and the polarization rotating element 46 via the grating assembly 44; and a second mirror 54 for reflecting beams radiating between the single fiber 43 and the polarization rotating element 46 via the grating assembly 44. The end of the fiber 43 is located at the vicinity of the focal point of the collimating lens 50 which is formed from at least one piece of optical glass.

However, also illustrated in FIG. 4, the physical separation of the optical beam paths is necessary to make room for the half-wave plate. This greatly increases the optical path length, making a compact design difficult, adding to the design challenges and also degrades the optical performance. The temperature dependence of the grating is also an important issue that is neglected in this design which especially important when three elements need to be actively aligned and fixed and held over operational temperature conditions with small tolerance. Small changes in these components lead to angular deviations of the light that reduce the output coupling of the device. In addition, what was not investigated or prescribed how to achieve in U.S. Pat. No. 6,563,977 is that there are many side effects due to multiple reflections and undiffracted (zeroth order) and higher order diffraction modes making the idea in U.S. Pat. No. 6,563,977 impractical. This is especially true for applications requiring high signal to noise ratios. Because of the interference of these reflections and multiply diffracted beams with the primary diffraction the design in U.S. Pat. No. 6,563,977 cannot support the low noise required for WDM, or the requirements for low insertion loss ripple and low multipath interference. These considerations are especially important in WDM applications where signal-to-noise ratios need to be 40 dB or greater.

Thus, we find that double passing a grating is known in the art but several important and essential operational features are not addressed in the art. For instance, U.S. Pat. No. 6,563,977 does not prescribe how to make the optical assembly thermally stable with low pointing error versus temperature, does not prescribe how to make the optical assembly produce high signal to noise ratios, does not prescribe how to achieve low insertion low ripple, does not prescribe how to achieve low back reflection, and does not prescribe how to reduce or eliminate multipath interference. All of these aforementioned qualities must be addressed in the design concept to make the use of double passing a transmission grating for WDM or DWDM applications practical.

It is within this context that embodiments of the present invention arise.

SUMMARY

According to an embodiment of the present invention, an optical assembly may comprise a prism having first, second and third surfaces. A transmission grating may be bonded to the first surface. A first mirror coating may be applied or bonded to the second surface and a second mirror coating may be applied or bonded to the third surface. The first, second and third surfaces, the transmission grating and the first and second mirror coatings may be configured such that light of a predetermined wavelength entering the prism that is incident on the transmission grating is diffracted a first time by the transmission grating towards the second surface, reflected from the second surface to the third surface, reflected from the third surface back to the transmission grating, and diffracted a second time by the transmission grating as the light exits the prism.

By way of example, and not by way of limitation, the transmission grating may be bonded to the first surface by epoxy or optical contacting.

The second and third surfaces and the transmission grating may be oriented such that the light of the predetermined wavelength undergoes an even number of reflections between being diffracted the first time by the transmission grating being diffracted the second time by the transmission grating.

The first surface may include an anti-reflection coating between the transmission grating and the prism.

The first or second mirror coating is made by depositing a reflective material directly onto the second or third surfaces of the prism respectively.

The first and second mirror coatings may be made by bonding mirrors to the second and third surfaces of the prism.

In some embodiments, the optical assembly may further comprise a quarter wave plate (QWP) disposed between the first mirror coating and the second surface. By way of example and not by way of limitation, the QWP may be bonded to the second surface of the prism. The quarter waveplate may include first and second surfaces with the first surface of the quarter waveplate is attached to the second surface of the prism and the first mirror coating formed on the second surface of the quarter waveplate. In such an embodiment, the first mirror coating may comprise a reflective material bonded to the quarter wave plate.

The transmission grating may be made of a material having the same index of refraction as the prism. Alternatively, the transmission grating may include a grating substrate made of a different material than the prism.

In some embodiments, the materials used for the transmission grating and prism are selected such that a temperature dependence of a grating spacing of the grating is counteracted by a temperature dependence of the index of refraction of the prism. For example, the transmission grating may include a substrate made of Pyrex and the prism may be made of N-PK52.

In some embodiments the grating spacing of the transmission grating, the index of refraction of the transmission grating, and the index of refraction of the prism may be selected such that the optical assembly suppresses reflection and transmission of diffraction orders other than a predetermined diffraction order.

BRIEF DESCRIPTION OF THE DRAWINGS

FIG. 15 is a plot showing the angle change as a function of temperature for fused silica grating and mirrors with air in between.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the examples of embodiments of the invention described below are set forth without any loss of generality to, and without imposing limitations upon, the claimed invention.

As described in the above section, the performance of a diffraction grating is highly dependent on the surface profile, which in turn depends on how the grating is fabricated. For high efficiency grating designs, it is typical to have only a few diffraction orders by making $\Lambda$ close to the incident wavelength, $\lambda$. In addition, by designing a large diffraction angle, the diffraction coefficient may be enlarged. Yet, the grating response may still suffer relatively large PDL and temperature dependence. For a reflection grating, one can choose a grating substrate with a very low thermal expansion coefficient (CTE). However, for a transmission grating, the choice of substrate is somewhat more limited because the substrate has to be transparent and homogeneous for light transmission.

The foregoing considerations may be taken into account in making a high performance grating. However, at the design limit, cascading two or more gratings may offer a better performance tradeoff.

Figure 5:
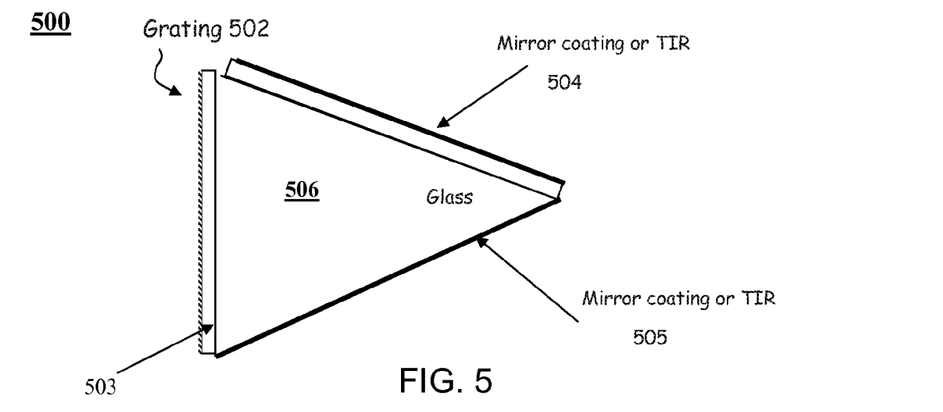
FIG. 5 is a top view of a double-pass grating (DPG) according to an embodiment of the present invention.

FIG. 5 is a top view of a double-pass grating (DPG) 500 according to an embodiment of the present invention. As shown in FIG. 5, a transmission grating 502 is bonded to a prism 506, e.g. glass, as an example either by epoxy or optical contacting. The grating 502 may be formed on a substrate and bonded to another substrate which is, in turn, bonded to the prism 506. Alternatively, the surfaces between the grating 502 and the prism 506 may be coated with anti-reflection coating 503 so that they don't have to be brought to intimate contact. The mirror coatings 504, 505 can be made by depositing mirror directly onto the prism. Alternatively, reflection at certain surfaces of the prism 506 may be obtained by bonding mirrors to the sides of the prism or by total internal reflection (TIR) at the prism surfaces if the incident angle is above a critical angle.

Figure 6:
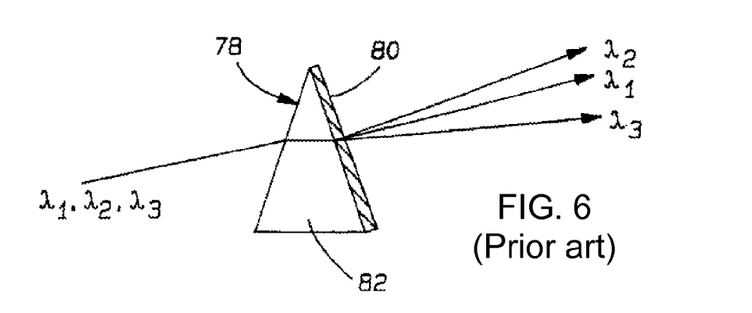
FIG. 6 is a perspective view illustrating a grating structure of the prior art.

Clearly, the grating construction in FIG. 5 takes a very different form from most of the gratings in all literature with the possible exception of a grating structure called Grism, which is disclosed in U.S. Pat. No. 5,652,681 as described above. As shown in FIG. 6, the Grism 78, which combines a grating 80 and a prism 82, is very different in both structure and function from the optical assembly described herein. In the Grism 78, light incident on the prism is refracted by the prism. Due to the dispersive nature of the material of the prism, different wavelengths of light are refracted at different angles, which are represented as separate rays in FIG. 6. These separate rays are incident on the grating 80 which further disperses the different wavelengths by diffraction but the light does not double-pass the grating as in the present DPG described herein Differences between the Grism and the embodiments of the present invention will be apparent from the following the description.

The optical assembly described herein also differ from that of U.S. Pat. No. 6,563,977 illustrated in FIG. 4 in which two separate mirrors are used to perform the function of the double pass. First, using two surfaces of a prism to reflect the light provides a much better thermal stability than three separate parts to be assembled together. Second, the index of refraction of the prism may be chosen to compensate for the temperature dependence of the grating itself. Third, in one embodiment, a double-passed quarter wave plate may be used to further reduce the polarization dependence, as compared with the mounting of a $4^{th}$ element as in U.S. Pat. No. 6,563,977.

Figure 7:
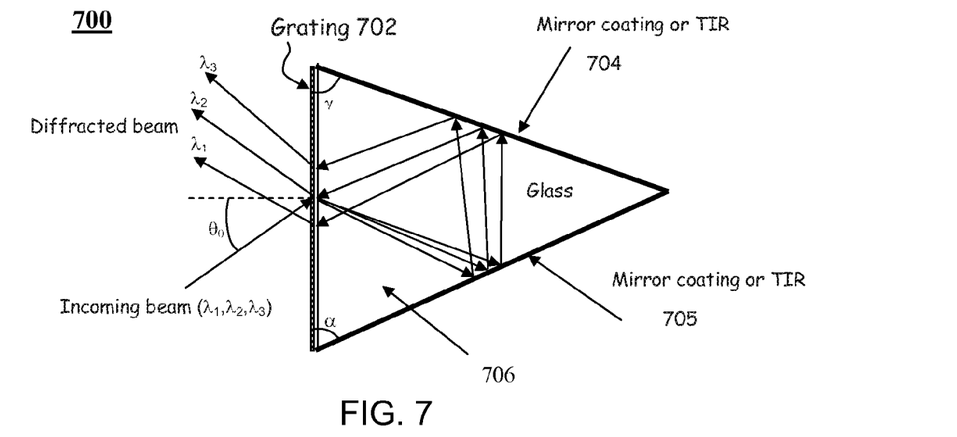
FIG. 7 is a top view showing the beam path in a DPG of FIG. 5 according to an embodiment of the present invention.

In order to describe the basic working principle, the index of the substrate of the grating is assumed the same as that of the prism and the mirror coating is deposited directly onto the sides of the prism as shown in FIG. 7.

FIG. 7 is a top view of a DPG 700 according to an embodiment of the present invention. The periodic grating structure 702 is formed at the vertical interface of the prism 706. Mirror coatings 704, 705 are deposited onto the sides of the prism 706. Although the grating 702 in FIG. 7 is a surface relief grating, however any transmission grating can be used. The light enters from the air at the left. Because the diffraction beam stays in the glass substrate (rather than going into the air as in FIG. 2), Equation 1 may be modified as:

$$\Lambda(\sin\theta_{in} + n_s \sin\theta_N) = N\lambda \qquad \text{Equation 3}$$

where $n_s$ is the index of refraction of the substrate material for the grating. Note that both $\Lambda$ and $n_s$ are temperature dependent and $n_s$ is also wavelength dependent (dispersion of the medium). For simplicity without losing generality, the index of the prism is desirable to be the same as that of the grating substrate to simplify the derivation of equations.

The prism has two angles designated as $\alpha$ and $\gamma$. It can be shown that the angle of incidence of light impinging to the grating from the glass side may be computed by:

$$\Lambda'_N = 2(\alpha+\gamma-90°) - \theta_N \qquad \text{Equation 4}$$

Subsequently, the light is diffracted by the grating structure for a second time. The exit angle may be computed by:

$$\Lambda(\sin\theta_{out} + n_s \sin\theta'_N) = M\lambda \qquad \text{Equation 5}$$

Note that the integer M in Equation 5 does not need to be the same as the integer N in Equation 3.

For a high performance grating design, it is often desirable to limit the number of the diffracted beams to only one.

For a special case when N=M=−1, Equation 5 can be solved as:

$$\theta_{out} = \arcsin\left[\frac{\lambda}{\Lambda} - \left(\frac{\lambda}{\Lambda} - \sin\theta_{in}\right)\cos[2(\alpha+\gamma)] + \sqrt{n_s^2 - \left(\frac{\lambda}{\Lambda} - \sin\theta_{in}\right)^2}\sin[2(\alpha+\gamma)]\right] \qquad \text{Equation 6}$$

It is important to note that, in order to enlarge the dispersion, there has to be even number of reflections before the light impinges on the grating for the second time. If one simply put a mirror to reflect the light back to the grating, the effect of dispersion actually is reduced, rather than enlarged.

In a special case that the sum of α and γ is 90°, Equation 6 may be simplified to:

$$\sin\theta_{out} = \frac{2\lambda}{\Lambda} + \sin\theta_{in}$$ Equation 7

$$\frac{d\theta_{out}}{d\lambda} = \frac{2}{\Lambda\cos\theta_{out}}$$ Equation 8

Compared with Equation 2, the dispersion coefficient is increased by a factor of two for the $1^{st}$ order mode.

Although Equation 6 gives the output angle of the light according to the wavelength with enlarged dispersion coefficient, the subtlety of the double pass grating described herein does not end there. One of its important aspects is the possibility of being useable in high performance systems where extremely low cross talk is required.

As depicted in FIG. 2, there are other orders of diffraction. For cross talk concerns, a small amount of noise (for example, 0.01%, −40 dB) light is not tolerable. For the sake of illustration, the signal and several non-signal beams or noise sources are analyzed below as a way of example.

Using FIG. 5 as an example, the optical paths are traced as follows:

TABLE 1

Optical paths of diffracted, transmitted and reflected beams

| Case | 1st grating interface | 2nd grating interface | Comment |
|---|---|---|---|
| 1 | −1D | −1D | Signal |
| 2 | 0R |  | reflection |
| 3 | 0T | 0T | −transmission |
| 4 | 0T | −1D | diffraction |
| 5 | −1D | 0T | diffraction |

In Table 1, T means transmission at the grating surface; D means diffraction and R means reflection. The number before D indicates the diffraction order. For transmission and reflection, there are only $0^{th}$ orders. In this example, we assume there are only $0^{th}$ and $-1^{st}$ diffraction orders by proper choices of design parameters.

Figure 8:
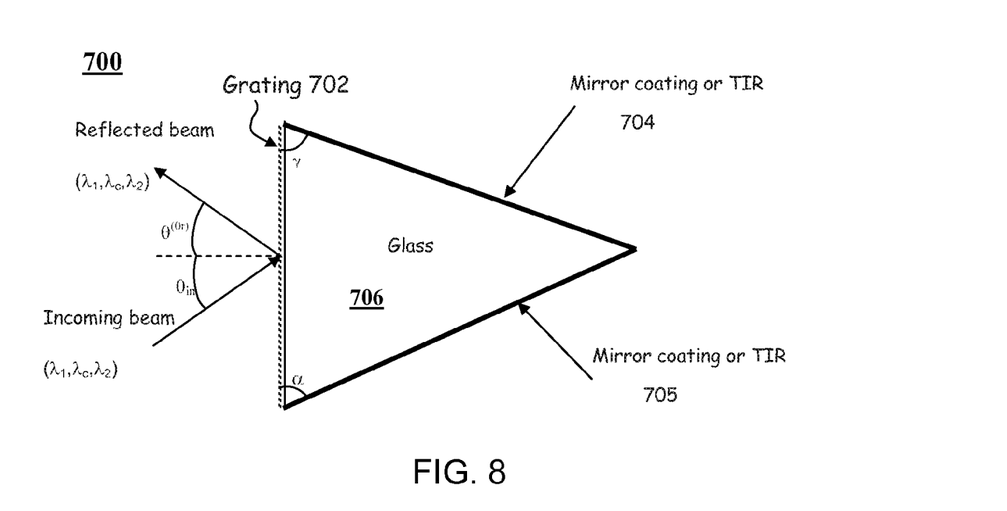
FIG. 8 is a top view illustrating a DPG of FIG. 5 with $0^{th}$ order reflection at grating.

Case 1: $-1^{st}$-order diffraction and : $-1^{st}$-order diffraction
The resulting angle is presented in Equation 6 above.
Case 2: $0^{th}$-order reflection, which is shown in FIG. 8.

$$\theta_{out}^{(0r)} = \theta_{in}$$ Equation 9

Figure 9:
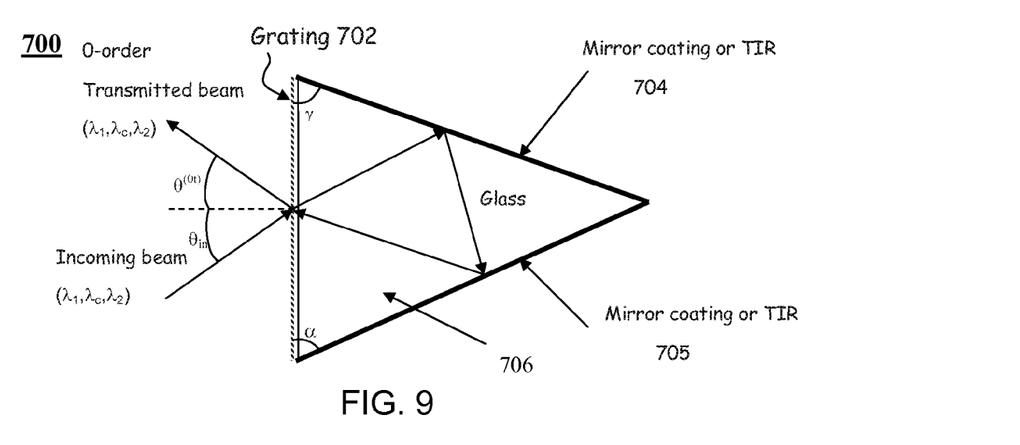
FIG. 9 is a top view illustrating a DPG of FIG. 5 with $0^{th}$ order transmission.

Case 3: $0^{th}$-order transmission, which is shown in FIG. 9.

$$\theta_{out}^{(0t)} = \arcsin\left[\sin\theta_{in}\cos[2(\alpha+\gamma)] - \sqrt{n^2-(\sin\theta_0)^2}\sin[2(\alpha+\gamma)]\right]$$ Equation 10

Figure 10:
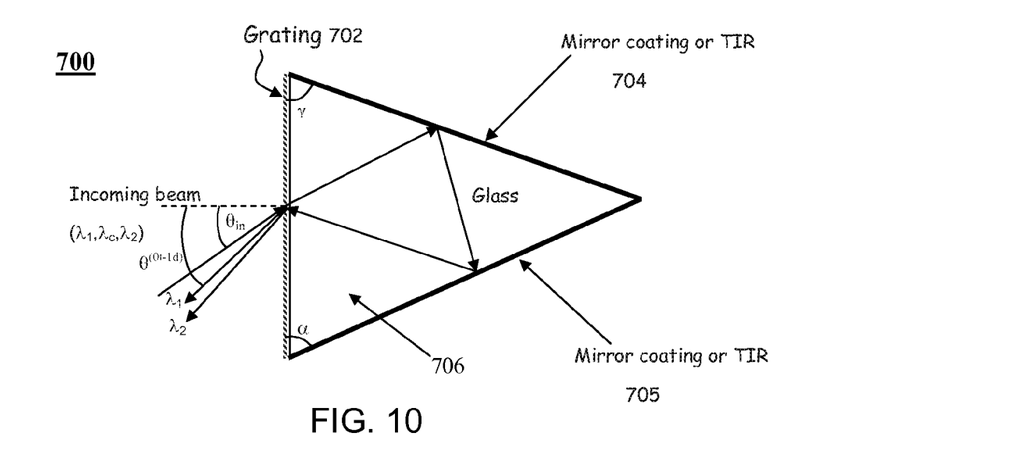
FIG. 10 is a top view illustrating a DPG of FIG. 5 with $0^{th}$ order transmission and $-1^{st}$ order diffraction.

Case 4: 0-order transmission and −1-order diffraction, which is shown in FIG. 10.

$$\theta_{out}^{(0t,-1d)} = \arcsin\left[\frac{\lambda}{\Lambda} + \sqrt{n^2-(\sin\theta_0)^2}\sin[2(\alpha+\gamma)] - \sin\theta_{in}\cos[2(\alpha+\gamma)]\right]$$ Equation 11

Figure 11:
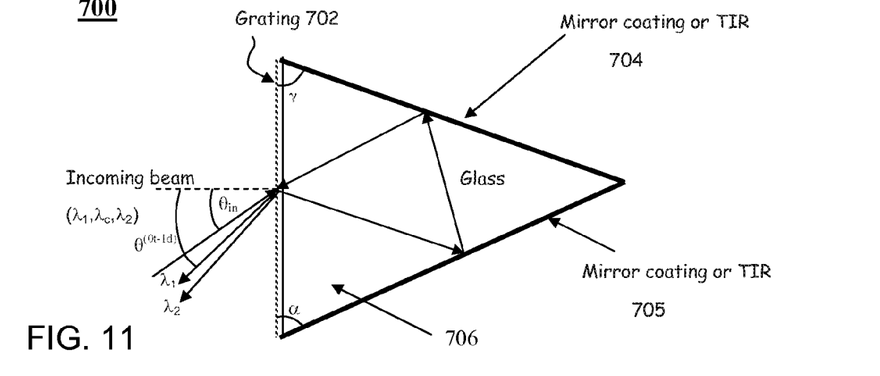
FIG. 11 is a top view illustrating a DPG of FIG. 5 with $-1^{st}$ order diffraction and $0^{th}$ order transmission.

Case 5: 0-order transmission and −1-order diffraction, which is shown in FIG. 11.

The resulting angle is identical to that of Case 4.

$$\theta_{out}^{(-1d,0t)} = \arcsin\left[\left(\frac{\lambda}{\Lambda}-\sin\theta_0\right)\cos[2(\alpha+\gamma)] - \sqrt{n^2-\left(\frac{\lambda}{\Lambda}-\sin\theta_0\right)^2}\sin[2(\alpha+\gamma)]\right]$$ Equation 12

In order to have low cross talk in the forward direction, the reflected beam from Case 2 and the unwanted transmission from Case 3 must be avoided.

Figure 12:
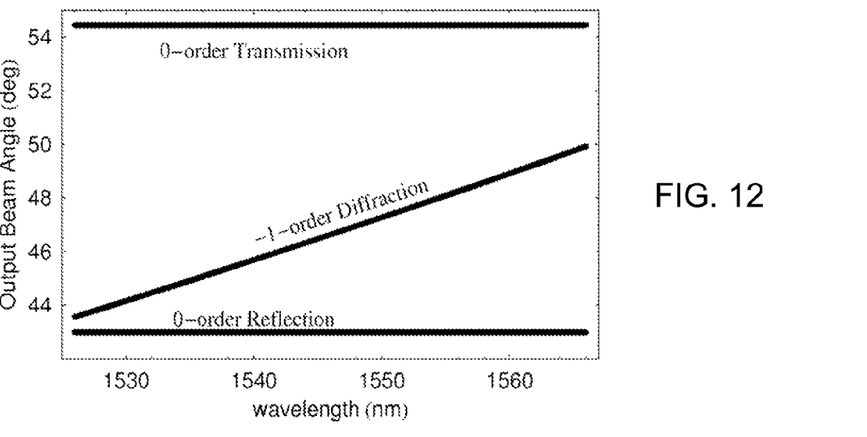
FIG. 12 is a plot showing the angles as functions of wavelength for DPGs of FIGS. 7-9.
Figure 13:
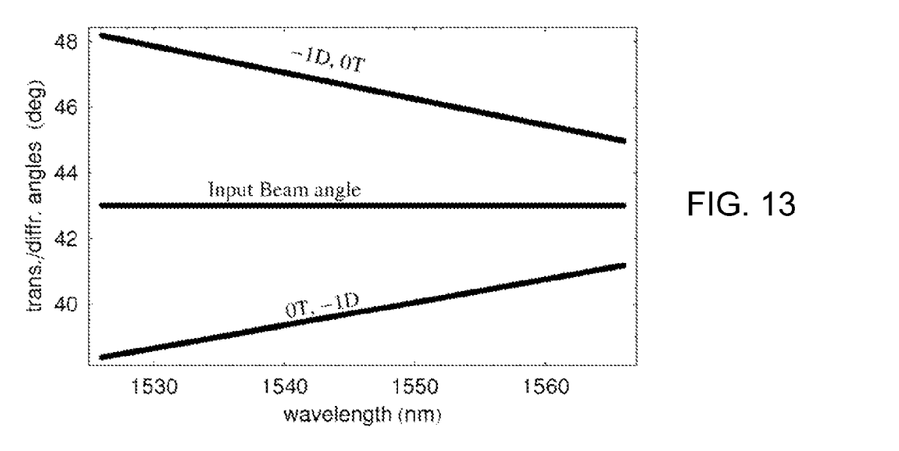
FIG. 13 is a plot showing the angles as functions of wavelength for input beam and DPGs of FIG. 14 is a top view of a double-pass grating with quarter-wave plate (QWP) according to an embodiment of the present invention.

By choosing λ/Λ close to 1.5 with ns close to 1.5, Equation 4 only has two solutions with N=0 or N=−1 because the sine function has a range between −1 and 1. The surface profile is designed so that most of energy is diffracted to the $1^{st}$ order mode and very little energy goes to the $0^{th}$ order mode, meaning they must be substantially outside that angle range, which is about 44° to 50°, of the desired diffraction angle of wavelengths of interest. FIG. 12 is a plot illustrating the angles as a function of wavelength for cases 1, 2 and 3 and FIG. 13 is a plot illustrating the angles as a function of wavelength for input beam and cases 4 and 5. Thus, with these design constraints the interference of noise light with signal light is avoided such that detrimental interference effects are avoided including: insertion loss ripple, multipath interference, whereas a high signal to noise ratio may be achieved.

Although not limited to the above special case this example illustrates the issue and the design of the avoidance of noise light. In addition, it is also important for many applications that the back reflection to the input beam is minimized (return loss).

The purpose of the analysis of the non-signal beams is to demonstrate the design window of the double-pass grating concept to make it useable for WDM applications.

Figure 14:
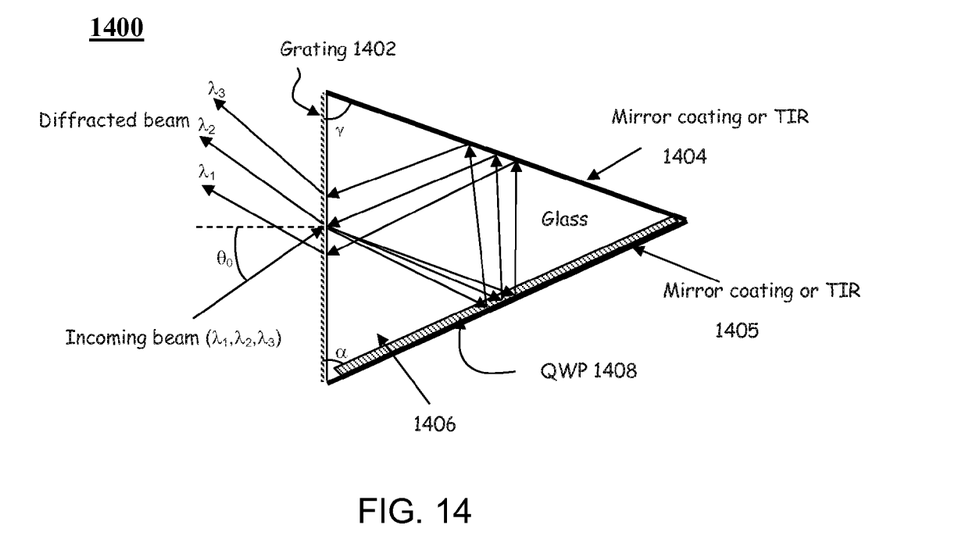

PDL Compensation:

A double pass grating of the type described herein can further reduce the polarization dependence by incorporating a quarter wave plate (QWP). In order to allow the beam overlapping, a quarter-wave (QWP) plate is used just before one of the mirrors. By way of example, FIG. 14 illustrates a top view of a double-pass grating 1400 with quarter-wave plate (QWP) according to an embodiment of the present invention. As shown in FIG. 14, a periodic grating structure 1402 is formed at a vertical interface of the prism 1406 and a quarter-wave plate 1408 is bonded to a side of the prism 1400. A mirror coating 1404 is coated on another side of the prism 1406 and another mirror coating 1405 is deposited onto the quarter-wave plate 1408. The light passes the QWP 1408 twice to rotate the polarization by about 90°, i.e., the polarization of the light is rotated 90° after passing the grating the first time and before passing the grating for the second time. The configuration of the double-pass grating 1400 achieves mechanical stability. In addition the choice of glass material of the prism can be used to reduce the temperature dependence.

Note that only the chief rays of the light beams are shown in FIG. 14. In real systems, the beam waist passing the grating needs to be very large to achieve high spectral resolution. By bonding a QWP to the surface of the prism, the optical beam can overlap, thus allowing a very compact optical system.

Minimizing Temperature Dependence:

The double pass grating design described herein can further configured to reduce the temperature dependence by carefully choosing the physical property of the grating substrate and the prism material. For simplicity, in the following derivation, the material of the grating substrate and the prism is the same. However, for those who are skillful in the field, the derivation may be generalized so that the grating and the prism have different indices of refraction.

For example, the materials used for the substrate of the transmission grating and prism may be selected such that a temperature dependence of a grating spacing of the grating is counteracted by a temperature dependence of the index of refraction of the substrate and the temperature dependence of the index of refraction of the prism. In a case where the grating is formed on one substrate and bonded to another substrate that is bonded to the prism the temperature dependences of both substrates and the prism may be chosen to counteract the temperature dependence of the grating spacing.

Equation 6 can be rewritten as below $$\sin\theta_{out} = \left[ \frac{\lambda}{\Lambda} - \left(\frac{\lambda}{\Lambda} - \sin\theta_{in}\right)\cos[2(\alpha+\gamma)] + \sqrt{n_s^2 - \left(\frac{\lambda}{\Lambda} - \sin\theta_{in}\right)^2} \sin[2(\alpha+\gamma)] \right]$$ Equation 13

$$\frac{d\sin\theta_{out}}{dT} = \left[ \frac{-\lambda}{\Lambda^2}(1 - \cos[2(\alpha+\gamma)])\frac{d\Lambda}{dT} + \frac{\sin[2(\alpha+\gamma)]}{\sqrt{n_s^2 - \left(\frac{\lambda}{\Lambda} - \sin\theta_{in}\right)^2}}\left(n_s\frac{dn_s}{dT} + \left(\frac{\lambda}{\Lambda} - \sin\theta_{in}\right)\frac{\lambda}{\Lambda^2}\frac{d\Lambda}{dT}\right) \right] = A\frac{d\Lambda}{dT} + B\frac{dn_s}{dT}$$ Equation 14

$$A = \left[ \frac{\sin[2(\alpha+\gamma)]}{\sqrt{n_s^2 - \left(\frac{\lambda}{\Lambda} - \sin\theta_{in}\right)^2}}\left(\frac{\lambda}{\Lambda} - \sin\theta_{in}\right) - (1 - \cos[2(\alpha+\gamma)]) \right]$$ Equation 15

$$B = \frac{n_s\sin[2(\alpha+\gamma)]}{\sqrt{n_s^2 - \left(\frac{\lambda}{\Lambda} - \sin\theta_{in}\right)^2}}$$

Figure 15:
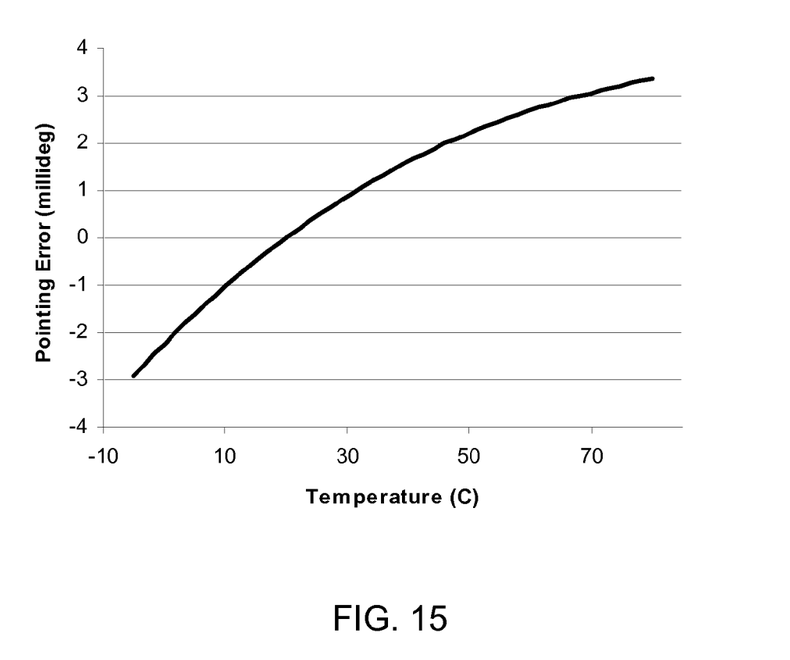
Figure 16:
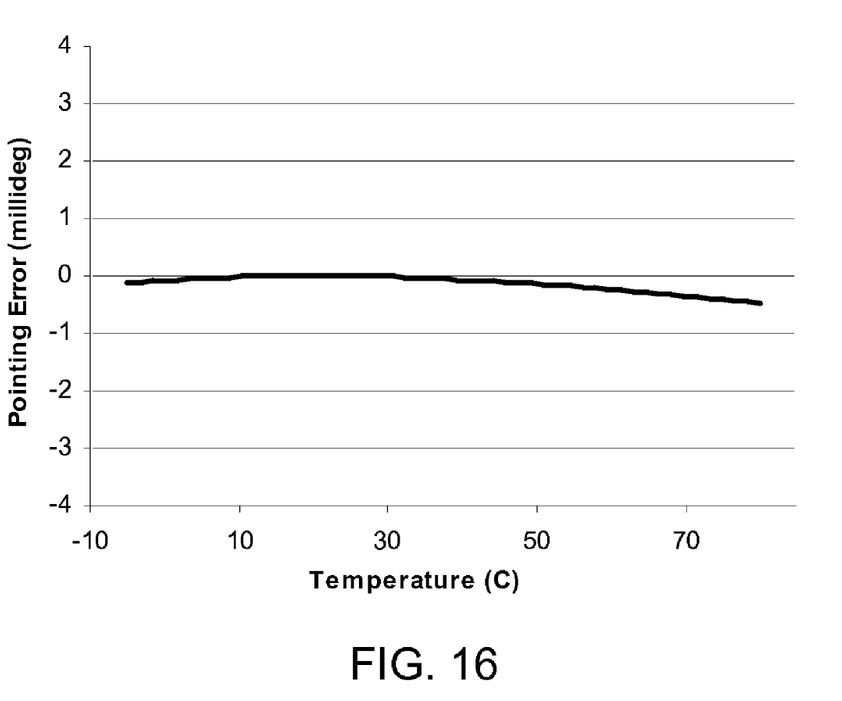
FIG. 16 is a plot showing the angle change as a function of temperature for a Pyrex grating and a N-PK52 prism.

As shown in Equation 14 it is possible to design the grating with proper choices of $n_s$ (T), and $$\frac{dn_s}{dT}$$

so that $$\frac{d\sin\theta_{out}}{dT}$$

is minimized. Typically, for most of the choices of glass materials, both $$\frac{d\Lambda}{dT}$$

and $$\frac{dn_s}{dT}$$

are positive. However, there are glass materials with negative $$\frac{dn_s}{dT}$$

such as the glass identified by CDGM glass code 497816, which is also available as N-PK52 from Schott North America, Inc. of Elmsford, N.Y. FIG. 15 and FIG. 16 illustrate the improved temperature stability of Double-Pass Grating. FIG. 15 is a plot showing the angle change as a function of temperature for fused silica grating and mirrors with air in between. As shown in FIG. 15, the diffraction angle change, respective to its value at 20° C., for double pass design using air as the medium between the gratings and the mirror. Over the temperature range of concern, a total diffraction angle change of 6 millidegrees occurs, representing a spectrum shift of 40 pm, which is about 10% of the channel spacing of the DWDM (dense wavelength division multiplexing) transmission using 50 GHz-frequency grid.

By choosing $$\frac{d\Lambda}{dT}$$

and $$\frac{dn_s}{dT}$$

carefully, e.g., by choosing Pyrex for the grating substrate and N-PK52 for the prism, the diffraction angle change, relative to its value at 20° C., may be reduced by a factor of 10. This is illustrated in FIG. 6, which is a plot showing the angle change as a function of temperature for Pyrex grating and N-PK52 prism.

In the above examples, very specific material and spectrum ranges were used for the illustration of the practicality of the double pass grating design described herein. However, by no means, are embodiments of this invention limited by the communication wavelengths and choice of the materials described in the above examples.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An optical assembly, comprising:
    a prism having first, second and third surfaces;
    a transmission grating bonded to the first surface;
    a first mirror coating bonded to the second surface;
    a quarter waveplate disposed between the first mirror coating and the second surface; and
    a second mirror coating bonded to the third surface, wherein the first, second and third surfaces, the transmission grating and the first and second mirror coatings are configured such that light of a predetermined wavelength entering the prism that is incident on the transmission grating is diffracted a first time by the transmission grating towards the second surface, reflected from the second surface to the third surface, reflected from the third surface back to the transmission grating, and diffracted a second time by the transmission grating as the light exits the optical assembly.

2. The optical assembly of claim 1 wherein the first, second and third surfaces and the transmission grating are oriented such that the light of the predetermined wavelength undergoes an even number of reflections between being diffracted the first time by the transmission grating being diffracted the second time by the transmission grating.

3. The optical assembly of claim 1 wherein the transmission grating is bonded to the first surface by epoxy or optical contacting.

4. The optical assembly of claim 1, wherein the first surface includes an anti-reflection coating between the transmission grating and the prism.

5. The optical assembly of claim 1 wherein the first or second mirror coating is made by depositing a reflective material directly onto the second or third surfaces of the prism respectively.

6. The optical assembly of claim 1 wherein the first and second mirror coatings are made by bonding mirrors to the second and third surfaces of the prism.

7. The optical assembly of claim 1 wherein the quarter wave plate (QWP) is bonded to the second surface of the prism.

8. The optical assembly of claim 1 wherein the first mirror coating comprises a reflective material bonded to the quarter wave plate.

9. The optical assembly of claim 1 wherein the quarter waveplate includes first and second surfaces, wherein the first surface of the quarter waveplate is attached to the second surface of the prism and wherein the first mirror coating is formed on the second surface of the quarter waveplate.

10. The optical assembly of claim 1 wherein the transmission grating is made of a material having the same index of refraction as the prism.

11. The optical assembly of claim 1 wherein the transmission grating includes a grating substrate made of a different material than the prism.

12. The optical assembly of claim 1 wherein the materials used for the transmission grating and prism are selected such that a temperature dependence of a grating spacing of the grating is counteracted by a temperature dependence of the index of refraction of the prism.

13. The optical assembly of claim 1 wherein the transmission grating includes a substrate made of borosilicate glass and the prism is made of N-PK52.

14. The optical assembly of claim 1 wherein the grating spacing of the transmission grating, the index of refraction of the transmission grating, and the index of refraction of the prism are selected such that the optical assembly suppresses reflection and transmission of diffraction orders other than a predetermined diffraction order.

15. The optical assembly of claim 1 wherein materials used for the substrate of the transmission grating and prism are selected such that a temperature dependence of a grating spacing of the grating is counteracted by a temperature dependence of the substrate and the temperature dependence of the index of refraction of the prism.

16. The optical assembly of claim 1 wherein optical materials used for a substrate of the transmission grating, that is attached or bonded to another substrate, and then bonded to the prism are selected such that a temperature dependence of a grating spacing of the grating is counteracted by a temperature dependence of the substrate of the transmission grating, the other substrate and prism, and a temperature dependence of the index of refraction of the optical materials.

17. The optical assembly of claim 1 wherein the quarter waveplate is configured such that the light that is diffracted a first time by the transmission grating towards the second surface and reflected from the second surface passes through the quarter waveplate twice.

* * * * *